United States Patent
Chang

(10) Patent No.: US 7,165,092 B2
(45) Date of Patent: Jan. 16, 2007

(54) SYSTEM AND METHOD FOR SHARING INFORMATION AMONG PROVIDER SYSTEMS

(75) Inventor: Kae-por F. Chang, Needham, MA (US)

(73) Assignee: Imagitas, Inc., Waltam, MA (US)

(*) Notice: Subject to any disclaimer, the term of this patent is extended or adjusted under 35 U.S.C. 154(b) by 639 days.

(21) Appl. No.: 09/929,519

(22) Filed: Aug. 14, 2001

(65) Prior Publication Data

US 2002/0032721 A1   Mar. 14, 2002

Related U.S. Application Data

(60) Provisional application No. 60/225,127, filed on Aug. 14, 2000.

(51) Int. Cl.
*G06F 15/16* (2006.01)
*H04L 29/06* (2006.01)
*H04L 29/08* (2006.01)

(52) U.S. Cl. .............. 709/205; 717/10; 717/101; 717/103; 717/174; 341/51

(58) Field of Classification Search ............. 709/203, 709/229, 220–223, 204–206; 717/174; 707/10, 707/200, 101, 103; 341/51; 705/14, 26
See application file for complete search history.

(56) References Cited

U.S. PATENT DOCUMENTS

| 6,175,829 | B1 | 1/2001 | Li et al. |
| 6,341,277 | B1 | 1/2002 | Coden et al. |
| 6,401,079 | B1* | 6/2002 | Kahn et al. ............ 705/30 |
| 6,434,619 | B1* | 8/2002 | Lim et al. ............. 709/229 |
| 6,606,744 | B1* | 8/2003 | Mikurak ............... 717/174 |
| 6,609,128 | B1* | 8/2003 | Underwood ........... 707/10 |
| 2001/0011250 | A1* | 8/2001 | Paltenghe et al. ...... 705/41 |
| 2002/0069218 | A1 | 6/2002 | Sull et al. |

* cited by examiner

*Primary Examiner*—Jeffrey Pwu
(74) *Attorney, Agent, or Firm*—Wolf, Greenfield & Sacks, PC

(57) ABSTRACT

A system is provided wherein information is provided once, and that information is provided to multiple provider systems. Information provided by a user is stored and implemented for each provider as needed. The information is provided by a user to a central server that distributes the information to one or more provider systems. In particular, the information is stored in a database and distributed to the provider system depending on the type of transaction. According to another aspect, a subset of the information is operated on as a group, and this subset is provided by a user on that basis. Because information is operated on as a group, related information may be easily transferred from the system to a provider.

19 Claims, 16 Drawing Sheets

Get help with all your moving needs – Online!

| Home | Change of Address | Shopping | Info Center | USPS.com | Privacy | About Us | Help |

Change your address online with the U. S. Postal Service ← 801

Please complete all of the following information. If you need help, please click the help link for instructions.

WHO is Moving?:
⦿ Individual   ○ Family   ○ Business (HELP) ← 802

Date to BEGIN forwarding mail:
[November ▶] [18 ▶] [1999 ▶] (HELP) ← 802

Date to STOP forwarding mail:
[January ▶] [1 ▶] [2000 ▶] (HELP)

Last Name:
[Smith] (HELP)

First Name:
[Jo] (HELP) ← 802

Middle Name (or Initial):
[F] (HELP)

Please verify if all of the above information is correct, then click the "Continue" button below.

[Continue] ← 804

Home | Change of Address

FIG. 8

Change your address online with the U. S. Postal Service

If you need help with any of the items on this form, click the help link for instructions.

What type of address is your OLD ADDRESS?
Street ▼

What type of address is your NEW ADDRESS?
Street with an Apartment or Suite ▼

Is your OLD ADDRESS:
In Puerto Rico?
◉ No  ○ Yes
On a domestic military installation?
◉ No  ○ Yes

Is your NEW ADDRESS:
In Puerto Rico?
◉ No  ○ Yes
On a domestic military installation?
◉ No  ○ Yes

OLD Street Address: 120 Oreland Ave
City: Oreland   State: PA
ZIP Code: 19075

NEW Street Address: 1 Symphony Rd
City: Boston   State: MA
ZIP Code: 02115

Please verify if all of the above information is correct, then click the "Continue" button below.

[Continue]

Home | Change of Address

FIG. 9

Get help with all your moving needs – Online!

| Home | Change of Address | Shopping | Info Center | USPS.com | Privacy | About Us | Help |

Change your address online with the U. S. Postal Service ⟵ 1001

Please check all of the following information for accuracy. If you need to make changes, please use the browser "Back" button. Otherwise, click "Continue".

Who is Moving?:
INDIVIDUAL

First Name: Last Name: Middle Name/Initial:
Jo Smith F

Date to begin forwarding mail: Date to stop forwarding mail:
November 18, 1999 January 1, 2000

| Old Address | New Address |

Street Address: Street Address:
120 Orlando Ave 1 Symphony Rd

City: State: City: State:
Oreland PA Boston MA

ZIP Code: ZIP Code:
19075 02115

[Continue] ⟵ 1004

Home | Change of Address

*FIG. 10*

*MoversGuide*.com

[Home] [Change of Address] [Shopping] [Info Center] [USPS.com] [Privacy] [About Us] [Help]

Get help with all your moving needs – Online!

Create your customized moving checklist
————————————————————— 1101

Please complete all of the following information and MoversGuide will create a checklist of things to do before, during, and after your move.

1. Are you moving yourself? ○ Yes ○ No
2. Are you moving with children? ○ Yes ○ No
3. Are you moving with pets? ○ Yes ○ No
4. Are you moving to a different state? ○ Yes ○ No
5. Are you buying a home? ○ Yes ○ No
6. Will you be renting a truck? ○ Yes ○ No
7. Will your move be part of a corporate relocation? ⊙ Yes ○ No

[Create Checklist]

Home | Moving Checklist

*FIG. 11*

*MoversGuide*.com    Get help with all your moving needs — Online!

| Home | Change of Address | Shopping | Info Center | USPS.com | Privacy | About Us | Help |

← 1201

CommunityCENTER
Find Community Information Online
Boston, Massachusetts

The world knows Boston for Brahminism and baked beans; creme pie and cod; Revers's ride, and that splash of tea in 1773. Locals know the "the Hub" for its unnavigable cart paths, loony drivers and love-hate relationship with the Red Sox.

Attitude, history and style run rampant on this city's cobblestoned streets, where the gridlocked masses go to creative extremes just to "pahk their cahs". Ah, the Boston Accent—defined by top linguists as "one-third Harvard, one-third hick and one-third mick". (Visitors: Consult the Wicked Good Guide to Boston English for help ordering a grinder and a frappe at the spa.)

From the tony shops of Newbury Street to the North End espresso huts, each Boston neighborhood impresses its own distinctive charm. And an hour drive in any direction produces a choice view of beach, forest or mountain.

Olde as Boston's soul may be, it is spry on the surface. With more than 60 colleges and universities, the beantown claims the highest student population in the U.S. That coupled with its forefront status in the biotech industry guarantees—and delivers—a population of sheer brainiacs.

So when you roll in to town with your normal accent and ask a native, " Where can I get scrod around here?", don't be surprised if the response is something like, "How delightful to hear the pluperfect subjunctive."

Home | Community Center | Boston, MA

*FIG. 12*

*MoversGuide*.com

Get help with all your moving needs – Online!

[Home] [Change of Address] [Shopping] [Info Center] [USPS.com] [Privacy] [About Us] [Help]

CommunicationsCENTER —— *1301*

You have chosen Cable Service.

Would you like to: —— *1302*

- ⊙ Connect
- ○ Disconnect
- ○ Connect and Disconnect

[Continue] —— *1304*

Home | Cable

*FIG. 13*

*MoversGuide*.com

Get help with all your moving needs – Online!

[Home] [Change of Address] [Shopping] [Info Center] [USPS.com] [Privacy] [About Us] [Help]

Communications CENTER ← 1401

To see the Cable Providers that service your new home, please input your new home address.

Note: * indicates a required field

*Street Address:
[156 Oak St] ← 1402

*State:
[MA]

*ZIP:
[02464] ← 1402

*City:
[Newton]

[Continue] ← 1404

Home | Cable

*FIG. 14*

*MoversGuide*.com

Get help with all your moving needs – Online!

| Home | Change of Address | Shopping | Info Center | USPS.com | Privacy | About Us | Help |

CommunicationsCENTER

Search Location: 156 Oak St. Newton, MA 02464        Change My Location

These are the cable providers who offer services in your area. Please select the provider and services you would like to learn more about.

| PROVIDER 1 ———1510 | PROVIDER 2 ———1512 |
|---|---|
| Show Me: ———1506<br>⦿ Cable Only<br>○ Cable, plus other savings on communications! | Show Me: ———1508<br>○ Cable Only<br>○ Cable, plus other savings on communications! |

[ Continue ] ———1504

Home | Cable

*FIG. 15*

*MoversGuide*.com

Get help with all your moving needs – Online!

| Home | Change of Address | Shopping | Info Center | USPS.com | Privacy | About Us | Help |

CommunicationsCENTER

Search Location: 156 Oak St. Newton, MA 02464     Change My Location —1601

Cable by AT&T —1602

☐ Total Communications Bundle     Price: $49.95
For the first time, you can get everything you need from one place.
Sign up now to enjoy 33% savings on all your comminications needs.
More Information     Channel Lineup ☐ One Rate Bundle —1602     $69.99
Some of our providers offer bundles which provide special savings on combinations of communication services..We will automatically show you the bundles available in your area given your selection above.
More Information     Channel Lineup ☐ Optimum Service     Price: $00.00
Some of our providers offer bundles which provide special savings on combinations of communication services..We will automatically show you the bundles available in your area given your selection above.
More Information —1602     Channel Lineup ☐ Optimum Plus Service     Price: $00.00
Some of our providers offer bundles which provide special savings on combinations of communication services..We will automatically show you the bundles available in your area given your selection above.
More Information     Channel Lineup

[ Continue ]—1604

Home | Cable

FIG. 16

SYSTEM AND METHOD FOR SHARING INFORMATION AMONG PROVIDER SYSTEMS

RELATED APPLICATION

This application claims priority under 35 U.S.C. §119(e) to commonly-owned, U.S. Provisional Patent Application Ser. No. 60/225,127 entitled, "System And Method For Sharing Information Among Provider Systems," filed Aug. 14, 2000, now abandoned, which is hereby incorporated by reference in it's entirety.

FIELD OF THE INVENTION

The invention relates generally to application programming, and more specifically, to storing user information in a central server that distributes the information to provider systems.

BACKGROUND OF THE INVENTION

Transactions using public and private networks have become commonplace. A transaction is generally performed by entities known as providers and consumers. A provider is generally an entity, such as a computer system that provides one or more products or services to consumers. A consumer may also be a computer system, operated by a user who is the consumer of such goods or services. These transactions may be, for example, a personal transaction such as buying a product or service over the Internet, or may be a business-to-business transaction performed over one or more public or private networks. These providers and consumers typically connect to the network and conduct transactions by sending and receiving messages using a communication protocol, such as the well-known TCP/IP communication protocol.

Consumers currently conduct transactions over networks such as the Internet. These transactions are commonly referred to as electronic commerce transactions, also known as "e-business" or "e-commerce transactions." Individual entities, such as companies, commonly use the Internet to conduct regular business transactions, including advertising their products to customers and processing transactions. Transaction information is generally stored at the company location or on the company system. If the person chooses to conduct business with another company, that person is generally required to enter his or her information with that company as well.

Transactions are typically performed using an application referred to as a browser, such as the Microsoft Explorer or Netscape browsers. A browser communicates to users through HTTP servers (or "Web servers") using the well-known HTTP transfer protocol. In this case, a browser displays an interface provided by the HTTP server, and the user provides information, such as identification information (name, address, phone, etc.), financial information (credit card number, expiration, name, etc.), or other information to conduct a transaction. The interface may be, for example, an HTML interface as known in the art, and the user may enter information into one or more fields of an HTML page. This information is then transferred to the server, wherein the information is processed and/or stored by a program executing at the server. The program may be, for example, a script, executable, or other type of program written in one or more programming languages, such as JavaScript, Java, Perl, cgi scripts, or the like. The information may be stored in a database, such as a relational, object, file system or other type of database known in the art. Other methods for transferring information between a server and client may be used, such as by implementing remote objects using Common Object Request Broker Architecture (CORBA), among others.

In general, computer systems that function as providers are commonly referred to as "hosts" or "servers," and systems that function as consumers are referred to as "clients." Client-server systems are well-known in the art, and form the basis for conducting transactions over the Internet. Servers generally receive transaction requests from clients and store information relating to those transactions. Server transaction functions are generally limited to the businesses that they support. For example, the site www.bn.com operated by Barnes and Noble bookstores includes servers that perform purchasing transactions with respect to purchasing media such as books, CDs, DVDs, and the like. Such servers generally allow a user to order and review transaction information associated with the transactions supported.

SUMMARY OF THE INVENTION

Conventional systems are deficient in that information needed to support transactions needs to be re-entered by a user each time the user accesses a different provider system. That is, users, through computer system interfaces enter the same or similar information into multiple systems. This additional data entry becomes problematic as the number of providers to support a single event is numerous. For example, when reserving a trip online, a user may need to access a plane reservation system, car rental system, hotel reservation system, restaurant guide, among other systems to support the trip. As each of these provider systems is accessed, the same or similar information needs to be entered, creating additional effort for the user.

According to one aspect of the invention, a system is provided wherein information is provided once, and that information is provided to multiple provider systems. According to one embodiment of the invention, information provided by a user is stored and implemented for each provider as needed. In one embodiment, the information is provided by a user to a central server that distributes the information to one or more provider systems. In particular, the information is stored in a database and distributed to the provider system depending on the type of transaction.

According to another aspect, a subset of the information is operated on as a group, and this subset is provided by a user on that basis. Because information is operated on as a group, related information may be easily transferred from the system to a provider. Also, graphical user interfaces may be adapted that may be reused for different providers, and programming costs are reduced.

According to another aspect, multiple groups of similar information associated with a user may be stored. For example, if the event is a move from one location to another, addresses of each location may be stored and accessed as needed. Also, information for a number of credit or debit cards may be stored and used as needed. Further, predefined knowledge regarding the event may be used to translate the stored information into fields for one or more provider systems. For instance, if a user living in one town moves to another town, the system may be operable to order the correct services in either the first town or the second. In particular, appropriate utility connection or disconnection requests may be issued to the providers of utilities associated with the first and second towns.

According to another aspect of the invention, a convenient information display is provided wherein information is acted on as a group. A key field may be used to manipulate the data as a group. For instance, multiple addresses of a user may be stored and displayed by a key field. For example, the system may display as a key field, the town of each address. The user may, through the interface, select a key field, selecting the entire group. This group of information, for example, may be automatically populated to fields in an entry interface, or automatically be selected as configuration information to support a transaction. Multiple fields are acted on as a group related by the key field. In another aspect of the invention, queries for information are arranged in question groups—such as those related to billing, shipping, personal or other information, and displayed to a user in general entry interface. By creating general entry interfaces, specific entry interfaces do not need to be created for different providers, and interface programming costs are reduced.

Also, graphical user interfaces may be adapted that may be reused for different providers, and programming costs are reduced. Further, multiple groups of similar information associated with a user may be stored. For example, if the event is a move from one location to another, addresses of each location may be stored and accessed as needed. Also, information for a number of credit or debit cards may be stored and used as needed. Further, predefined knowledge regarding the event may be used to translate the stored information into fields for the provider system. Further, a convenient information display is provided wherein information is acted on as a group. A key field may be used to manipulate the data as a group. For instance, multiple addresses of a user may be stored and displayed by a key field. For example, the system may display as a key field, the town of each address. The user may, through the interface, select a key field, selecting the entire group. This group of information, for example, may be automatically populated to fields in an entry interface, or automatically be selected as configuration information to support a transaction. Multiple fields are acted on as a group related by the key field. In another aspect of the invention, queries for information are arranged in question groups—such as those related to billing, shipping, personal or other information, and displayed to a user in general entry interface. By creating general entry interfaces, specific entry interfaces do not need to be created for different providers, and interface programming costs are reduced.

These and other advantages are provided by:

A system for sharing information among provider systems, comprising an interface for receiving information from one or more users to support a plurality of transactions each of which is performed with at least one of a plurality of provider systems; a database in which the received information is stored; and an information manager operable to provide the received information to the plurality of provider systems based upon the transaction performed. According to another embodiment of the invention, the interface is a network interface coupled to a network including one or more clients. According to another embodiment, the database is a relational database (RDBMS). According to another embodiment, the system provides the received information to the plurality of provider systems based upon a mapping between fields of the received information and expected fields of the provider. According to another embodiment, the manager is operable to associate a plurality of fields of the received information as a group, and perform operations on the group.

A method for sharing information among provider systems, comprising receiving information from one or more users to support a plurality of transactions, each of which is performed with at least one of a plurality of provider systems; storing the information; and providing the received information to the plurality of provider systems based upon the transaction performed. According to another embodiment of the invention, the step of receiving further comprises receiving the information over a communication network. According to another embodiment, the step of storing includes storing the information in a database. According to another embodiment, the method further comprises providing the received information to the plurality of provider systems based upon a mapping between fields of the received information and expected fields of the provider. According to another embodiment, the method further comprises associating a plurality of fields of the received information as a group and performing operations on the group.

A method for creating an online checkout process to enable a user to order from among a plurality of providers. The method comprises the steps of assembling a set of checkout questions from the plurality of providers. The method further comprises the steps of identifying related checkout questions and assigning each set of related checkout questions to a unique checkout object. The method further comprises the steps of determining common checkout objects from providers of a like product or service, and assigning the common checkout objects to the like product or service. The method further comprises the steps of assigning each non-common checkout object to a specific provider with which it is associated, and assembling said checkout process comprising checkout questions, wherein the user is required to complete each question associated with a common object only once when ordering from any provider that offers the like product or service.

An online system enabling transactions between a user and one or more of a plurality of providers. The online system comprises a database that stores objects, each object comprising a unique checkout question or a related set of checkout questions from the plurality of providers, wherein objects that are common to a plurality of providers of a like product or service are assigned to that product or service such that each checkout question associated with a common object is asked of the user only once regardless of a number of providers of the like product or service with which the user may wish to enter into a transaction. The online systems further comprises an interface for receiving information from the user in response to said questions, and wherein the database further stores the information and provides the information to the one or more of the plurality of providers.

Other advantages, novel features, and objects of the invention will become apparent from the following detailed description of the invention when considered in conjunction with the accompanying drawings, which are schematic and which are not intended to be drawn to scale. In the Figures, each identical, or substantially similar component that is illustrated in various Figures is represented by a single numeral or notation. Additionally, the left-most one or two digits of a reference numeral identifies the drawing in which the reference numeral first appears. For purposes of clarity, not every component is labeled in every Figure, nor is every component of each embodiment of the invention shown where illustration is not necessary to allow those of ordinary skill in the art to understand the invention.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings:

FIG. 8 is a web page according to one embodiment of the invention;

FIG. 9 is a web page according to one embodiment of the invention;

FIG. 10 is a web page according to one embodiment of the invention;

FIG. 11 is a web page according to one embodiment of the invention;

FIG. 12 is a web page according to one embodiment of the invention;

FIG. 13 is a web page according to one embodiment of the invention;

FIG. 14 is a web page according to one embodiment of the invention;

FIG. 15 is a web page according to one embodiment of the invention; and

FIG. 16 is a web page according to one embodiment of the invention.

DETAILED DESCRIPTION

The present invention will be more completely understood through the following detailed description which should be read in conjunction with the attached drawings in which similar reference numbers indicate similar structures. All references cited herein are hereby expressly incorporated by reference.

It should be understood that e-commerce transactions may be performed between any entities, whether they are individuals or companies. The term "company" will be used synonymously with "provider" or "individual" providing goods or services; the company, provider or individual may be any entity providing goods or services. The terms "customer," "consumer," "person," and "user" will also be used interchangeably as an entity that shops for, purchases and/or receives goods or services. The term "online" refers to a transaction or communication in a computer network environment such as the world wide web.

Also, it should be understood that questions that are common among providers to a service or a product are referred to as service-specific or product-specific questions. Related service-specific or product-specific questions can also comprise a service checkout object. Questions that are not common among providers to a product or service are referred to as provider-specific questions. Related provider-specific questions can also comprise a service checkout object.

Figure 1:
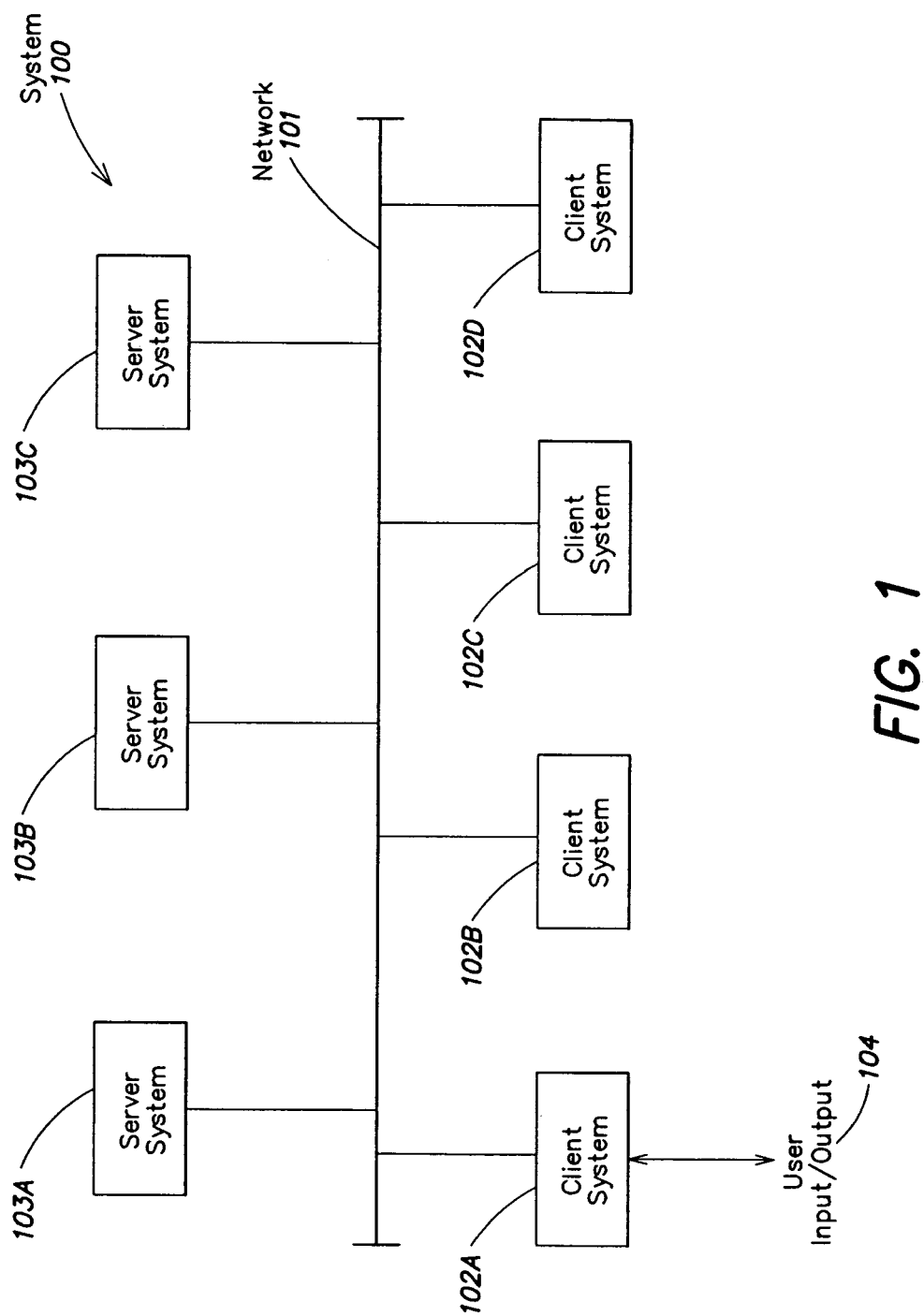
FIG. 1 is a block diagram of an environment suitable for performing various aspects of the invention.

FIG. 1 shows a system suitable for implementing various embodiments of the present invention. One or more client systems 102A–102D communicate with one or more server systems 103A–103C for the purposes of exchanging information and performing transactions. These systems 102, 103 communicate using a communication protocol such as TCP/IP over network 101. Server 103 may be, for example, an HTTP server that is configured to perform transactions. These servers 103 may accept and store information received from a user 102. In particular, a user 102 may provide and receive, respectively, input/output 104 through an interface of a client system 102. The information is transferred over network 101 and stored at one or more servers 103 using one or more communication protocols, such as TCP/IP and one or more transfer protocols such as HTTP. Other protocols are available as known to those of skill in the art.

The communication network 101 may be an ETHERNET network, Fast ETHERNET or other type of local or wide area network (LAN or WAN), a point-to-point network provided by telephone services, or other type of communication network or combination of networks thereof as known to those of skill in the art. Information consumers and providers, also referred to in the art as client and server systems 102, 103, respectively, communicate through the network 101 to exchange information.

Figure 2:
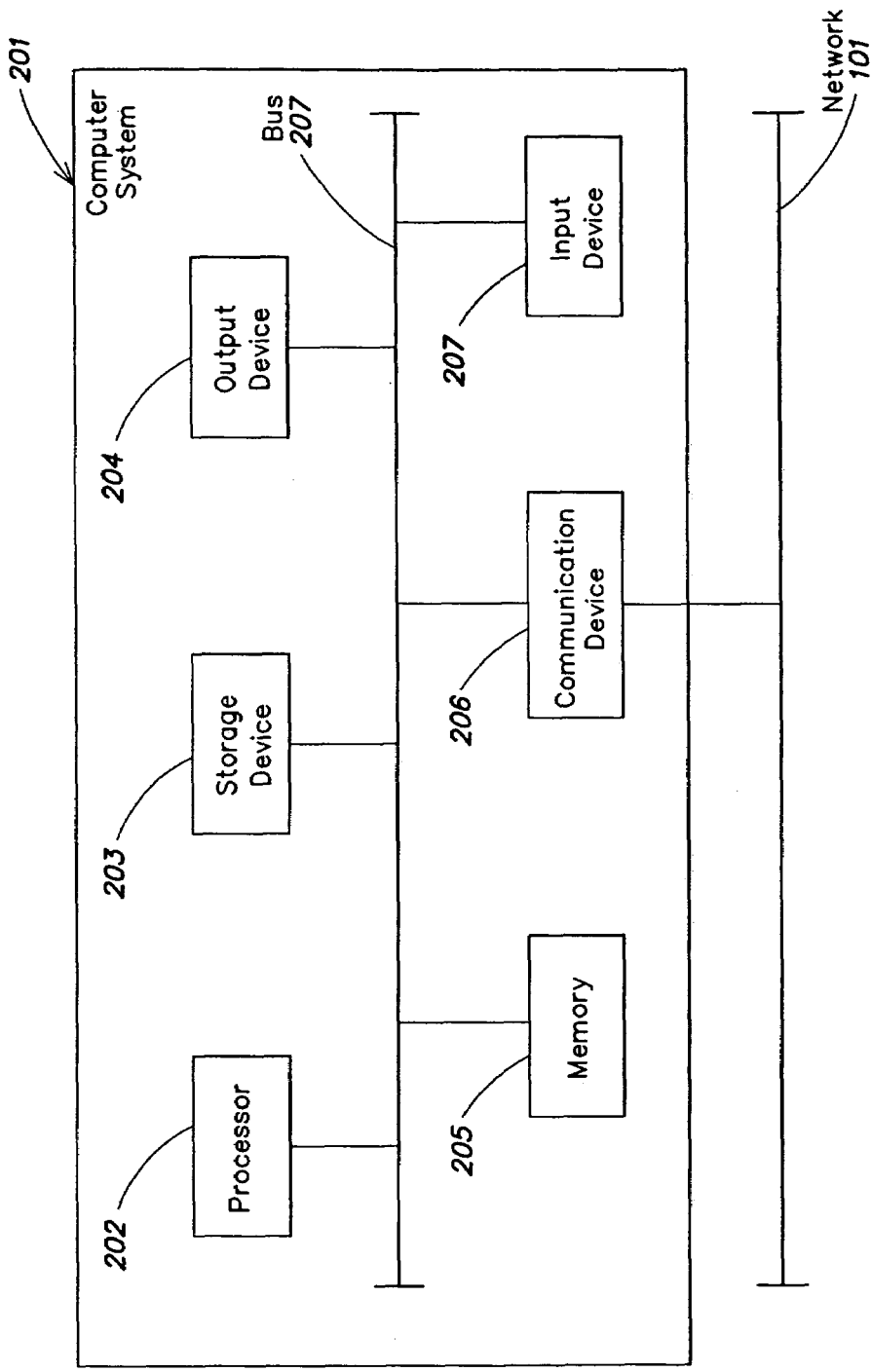
FIG. 2 is a block diagram of a general purpose computer system.

Computer systems 102, 103 may be general purpose computer systems 201 such as that shown in FIG. 2. The computer system 201 may include a processor 202 connected to one or more storage devices 203, such as a disk drive, through a communication device such as bus 207. The computer system 201 also includes one or more output devices 204, such as a monitor or graphic display or a printing device, and one or more input devices 207, such as a keyboard, mouse or other device. The computer system 201 typically includes a memory 205 for storing programs and data during operation of the computer system 201. In addition, the computer system 201 may contain one or more communication devices 206 that connects the computer system 201 to a communication network 101.

Computer system 201 may be a general purpose computer system that is programmable using a high level computer programming language. The computer system 201 may also be implemented using specially programmed, special purpose hardware. In computer system 201, the processor 202 is typically a commercially available processor, such as the PENTIUM, PENTIUM II, PENTIUM III, or StrongARM microprocessor from the Intel Corporation, PowerPC microprocessor, SPARC processor available from Sun Microsystems, or 68000 series microprocessor available from Motorola. Many other processors are available as known to those of skill in the art. Such a processor 202 usually executes an operating system which may be, for example, DOS, WINDOWS 95, WINDOWS NT, WINDOWS 2000, or WinCE available from the Microsoft Corporation, MAC OS SYSTEM 7 available from Apple Computer, SOLARIS available from Sun Microsystems, NetWare available from Novell Incorporated, PalmOS available from the 3COM corporation, or Linux or other UNIX-based operating systems available from various sources. Many other operating systems may be used as known to those of skill in the art.

It should be understood that the invention is not limited to a particular computer system platform, processor, operating system, or network. Also, it should be apparent to those skilled in the art that the present invention is not limited to a specific programming language or computer system and that other appropriate programming languages and other appropriate computer systems could also be used.

Figure 3:
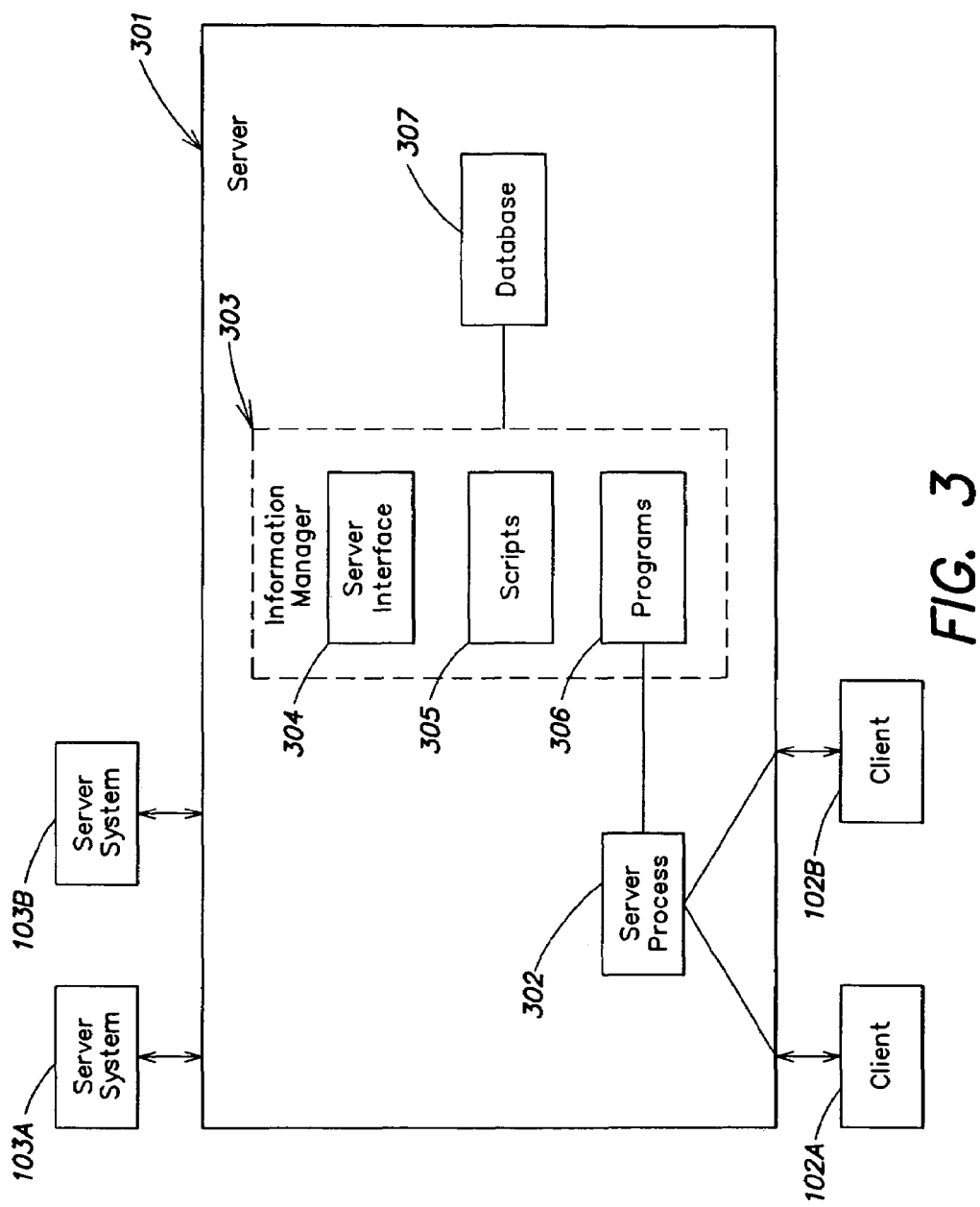
FIG. 3 is a block diagram of a system for managing information among a plurality of systems according to one embodiment of the invention.

FIG. 3 shows a block diagram of a system for managing information among a plurality of provider systems 103 according to one embodiment of the invention. Intermediate server 301, upon which various aspects of the invention may be implemented, may be, for example, a general purpose computer system as described above with reference to FIG. 2. Server 301, which may reside at a United States Postal Office, collects information provided by one or more clients 102 and provides this information to one or more provider systems 103. Information received from clients 102 is stored in database 307 and is provided to server 103, depending on the type of transaction. Secure Socket Layer Encryption is provided to protect information collected by server 301.

Server 301 includes an information manager 303 to perform management of information received from clients 102. Manager 303 may comprise one or more executable programs 306 or scripts 305 written in one or more programming languages. These programs and scripts are operable to handle requests, receive and process information, generate interfaces, and to store data in database 307. Server interface 304 is operable to broker information to one or more provider systems 103, and may be programmed in one or more programming languages, such as Java. Server interface 304 is also operable to perform one or more transactions on behalf of its users 102. Transactions may be performed electronically, such as by email, XML, or Electronic Data Interchange (EDI), or may be converted to alternative forms, such as fax and forms that are hand-processed. Other methods for transferring information and supporting transactions may also be used as known to those of skill in the art.

According to one embodiment of the invention, server 301 distributes information related to a single event to multiple providers 103 of goods and/or services. This single event may be composed of many smaller transactions, of which, multiple provider systems 103 must be accessed.

For example, the event may be an event such as a wedding, and the server 301 may maintain information related to weddings. The server 301 could allow a user 102 to perform one or more transactions with providers 103 of goods and services associated with weddings, and perform other wedding-related functions.

According to one aspect, server 301 maintains a mapping of data fields of provider systems 103 to a common field stored in database 307. Database 307 may be, for example, a relational database system such as Oracle, Access, or another database that is executed on server 301 or anther system. Server 301 collects information using standard input interfaces that are common to one or more providers 103.

Figure 4:
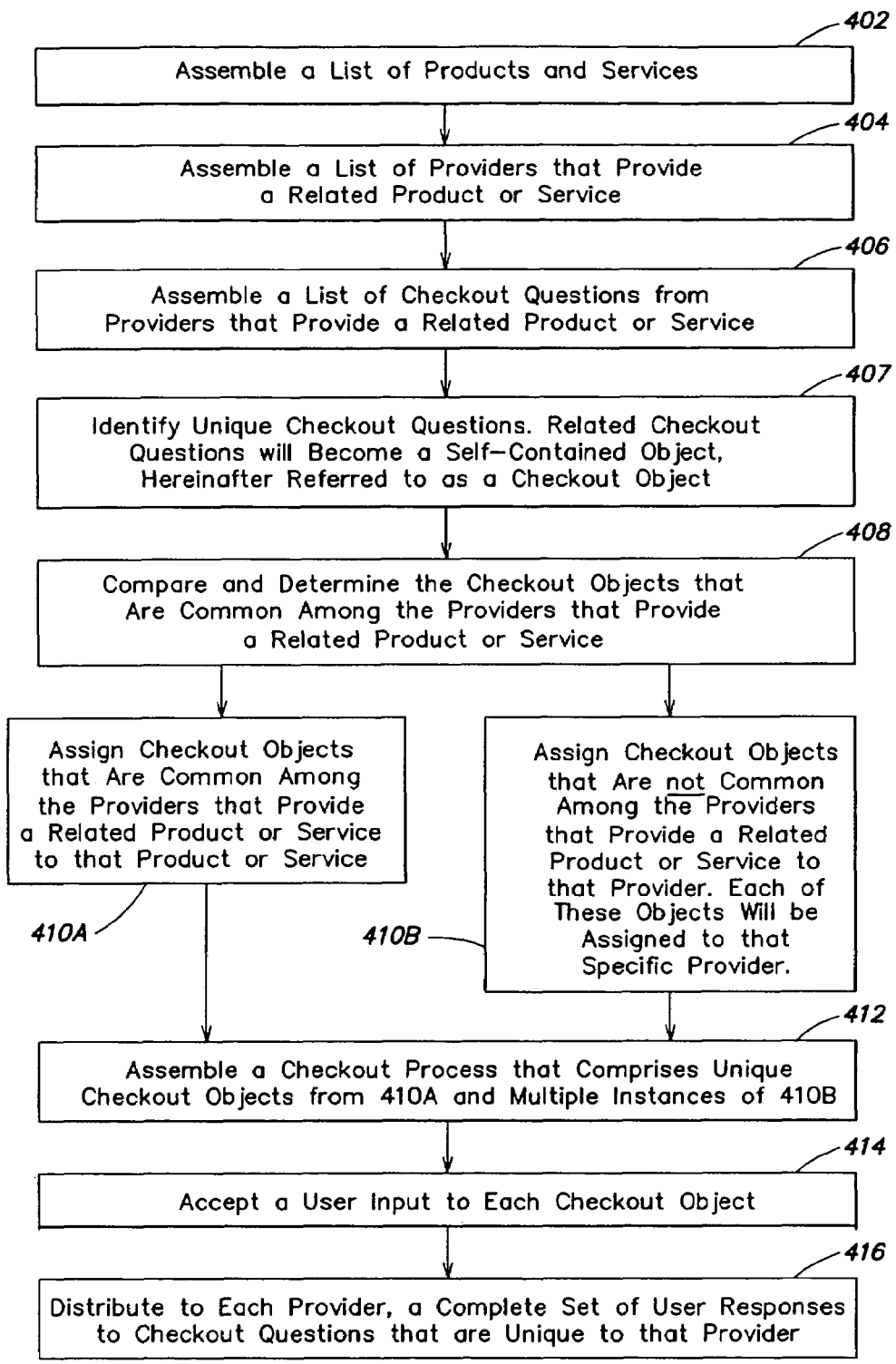
FIG. 4 is a block diagram of steps taken to assemble an online checkout process according to one embodiment of the invention.

FIG. 4 illustrates a block diagram of steps taken to set up a system and method for sharing information among provider systems. Step 402 involves assembling a list of products and services. These products and services can include, for example, services such as internet service, cable television, and long-distance telephone, and products such as packing supplies and maps. However, it is to be appreciated that this is not an exhaustive list of products and services that may be assembled. Almost any product and/or service may be assembled in step 402.

After a list of products and services has been assembled, a list of providers that provide a related product or service will be assembled in step 404. For example, a list of providers that provide the service long-distance telephone may include A T & T, Sprint, and MCI, among others.

Next, in step 406, a list of checkout questions from each of the providers that provide a related product or service will be assembled. Checkout questions from Sprint, for example, may include questions such as "Title," "First Name," "Last Name," "Address," "City," "State," "Zip Code," while checkout questions from MCI may only include questions such as "First Name," "Last Name," "Address," "City," "State," and "Zip Code."

After a list of checkout questions has been compiled from all of the providers, unique checkout questions will be identified in step 407. Related checkout questions will become a self-contained object, hereinafter referred to as a checkout object. Related is defined to be two or more checkout questions with similar characteristics. For example, the object "name" could comprise the two checkout questions "First Name" and "Last Name." Furthermore, once a checkout object is created, it will not be duplicated with the same checkout questions for another provider. In addition, it is an advantage that each provider that asks the same checkout questions will use the same checkout object. Additionally, if an object contains five related checkout questions, but a specific provider wishes to only have three of the five checkout questions displayed, there are parameters written into the code that will allow this functionality.

Continuing with the above example regarding long-distance telephone service, the checkout questions "Title," "First Name," "Last Name," "Address," "City," "State," and "Zip Code" may likely be grouped into two objects. The first object may be called the "name" object. In this example, the "name" object would include the question fields "Title," "First Name" and "Last Name." The second object may be called the "address" object and may include the question fields "Address," "City," "State," and "Zip Code." These two objects would be created in step 407. An object may comprise as few as one or as many checkout questions as desired.

After the checkout objects are created, the checkout objects will be compared to determine those checkout objects that are common among the providers that provide a related or like product or service in step 408.

In the next step 410A, checkout objects that are common among the providers that provide a related product or service will be assigned to that product or service. A checkout object is common among providers if the checkout object comprises at least one checkout question from each provider of a product or service. In addition, in step 410B, checkout objects that are not common among the providers that provide a related product or service will be assigned to the provider who provided the checkout questions associated with that checkout object. A checkout object is not common among providers if the checkout object does not comprise at least one checkout question from each provider of a product or service.

For example, in one embodiment a checkout object "License" may include the fields "State," "Number," and "Expiration Date." However, if only one out of five providers in a service requested information from a user with regard to the checkout object "License," this checkout object could be considered as not common. The number of providers required to ask a checkout question, related to a checkout object, in order for that checkout object to be considered "common" can vary.

Some checkout objects may be optional. In addition, each provider, within a service, can customize some or all checkout objects to meet their needs. Any questions can be asked in any sequence and in any format, color, font, etc.

Next, the objects are then assembled into a checkout process 412 that comprises the unique checkout objects that were common among all of the providers (from step 410A) and the checkout objects that were unique to one or more providers, and that were chosen by the one or more providers (step 410B). For example, the checkout process may include four common checkout objects, each of which is different, from step 410A and three provider checkout objects, again each of which is different, from step 410B. However, there may be multiple instances of the three provider checkout objects. In other words, there may be four total provider checkout objects, of which two are the same. The two checkout objects that are the same would be considered to be two instances of a checkout object. Furthermore, the checkout process may include the steps of determining which objects will be placed onto what page and in what sequence, among others.

Next, in step 414, a users input will be accepted in response to a checkout object and its associated checkout question. In other words, a user will reply online to a set of questions.

In step 416, a complete set of user responses to checkout questions that are unique to a provider, will be distributed to that provider.

Because common input interfaces are provided, great expense associated with developing and testing customer interfaces is reduced. Also, because information is collected in a reduced number of interfaces, data entry for the user 102 is decreased. Further, because information, products, and services associated with a single event are obtained through a single interface (and server site), the user 102 does not have to visit multiple sites to obtain such information, products, and services.

In addition, it is an advantage that questions posed to a user 102 through one or more interfaces are operated on as a group. A key data field of the group may be designated that may be used to manipulate its associated group data. For instance, to reduce the amount of time required to re-enter user 102 address information, system 301 may store a user's address in database 307 and present to the user 102, in an interface, a link to the group of data. By selecting this link, the group of information may be, for example, populated to fields of an ordering screen of a provider 103, or be automatically selected as information that supports a transaction with one or more providers 103.

Figure 5:
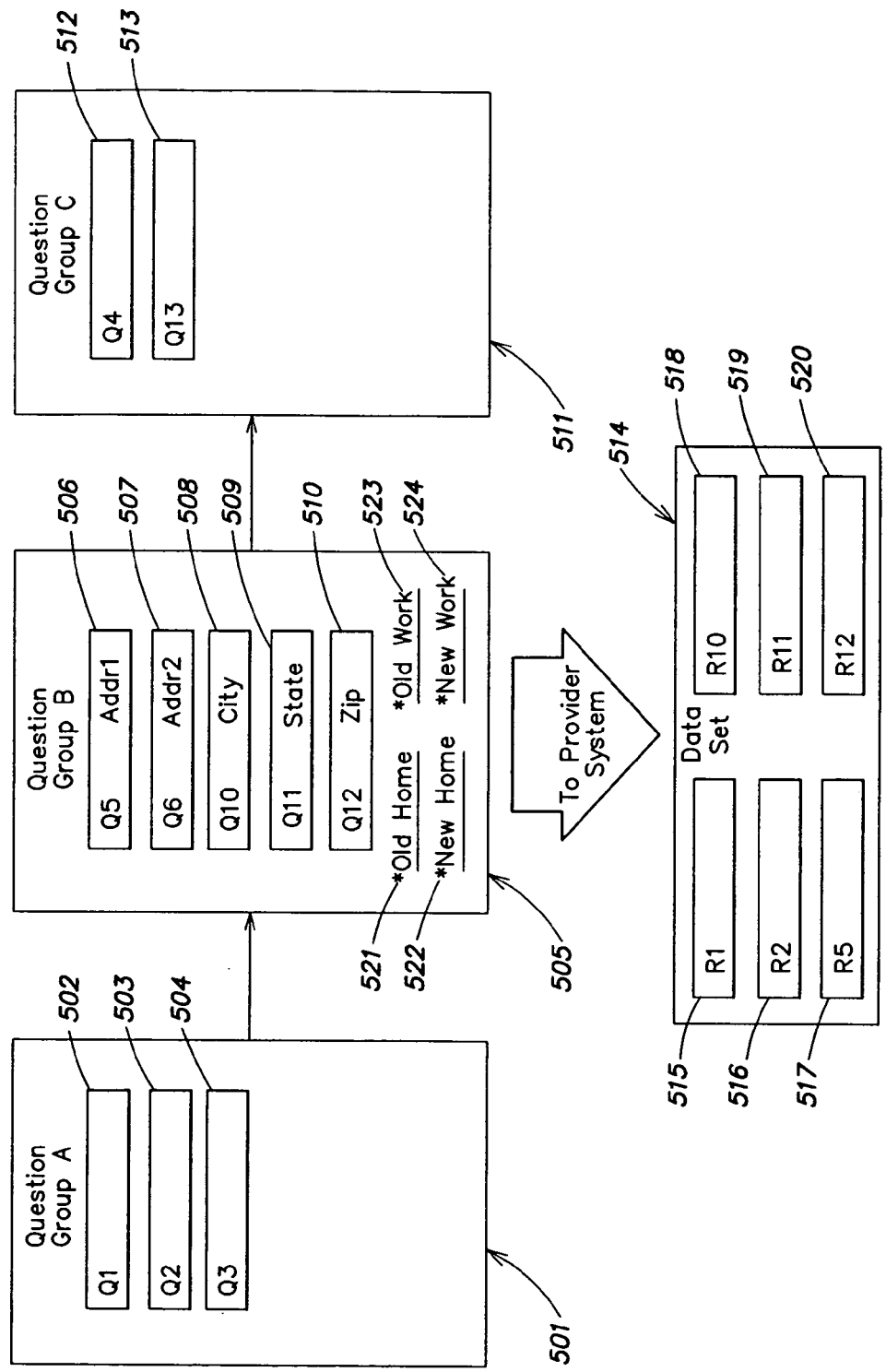
FIG. 5 is a block diagram of a series of objects or question groups of interfaces according to one embodiment of the invention.

FIG. 5 shows a number of question groups or objects 501, 505, 511 that may be presented to a user 102 in one or more interfaces. For example, object A (item 501) may include questions Q1–Q3 (items 502–504). These questions may be grouped as a set and related to a user 102 by a key field which may be one or more of question answers associated with the questions posed. For example, considering object B (item 505) that includes a number of question fields Q5–Q12 (items 506–510) related to address information, answers to the questions Q5–Q12 may be displayed to the user 102 as a link (items 521–524) to the group of information stored in database 307. Thus, for example, if the user 102 interface prompts for the use of an address, the user 102 may select the link identifying the data set, and that information may be entered automatically in the question fields. Any of the above disclosed objects may contain service-specific questions, provider level questions, marketing level questions, or any combination thereof. It is to be appreciated that modifying the contents or questions imposed to a user 102 at the object level is within ordinary skill of one in the art.

Server 301 gathers responses to the questions and provides these in turn to one or more provider systems 103, as necessary. In particular, a data set 514 provided to one or more server systems 103 may include only the subset of information necessary to complete lo the transaction. For example, set 514 includes responses R1, R2, R5, R10, R11, and R12 (items 515–520, respectively) to questions Q1, Q2, Q5, Q10, Q11, and Q12. In this manner, the number of interfaces necessary for collecting data are standardized and reduced in number.

Figure 6:
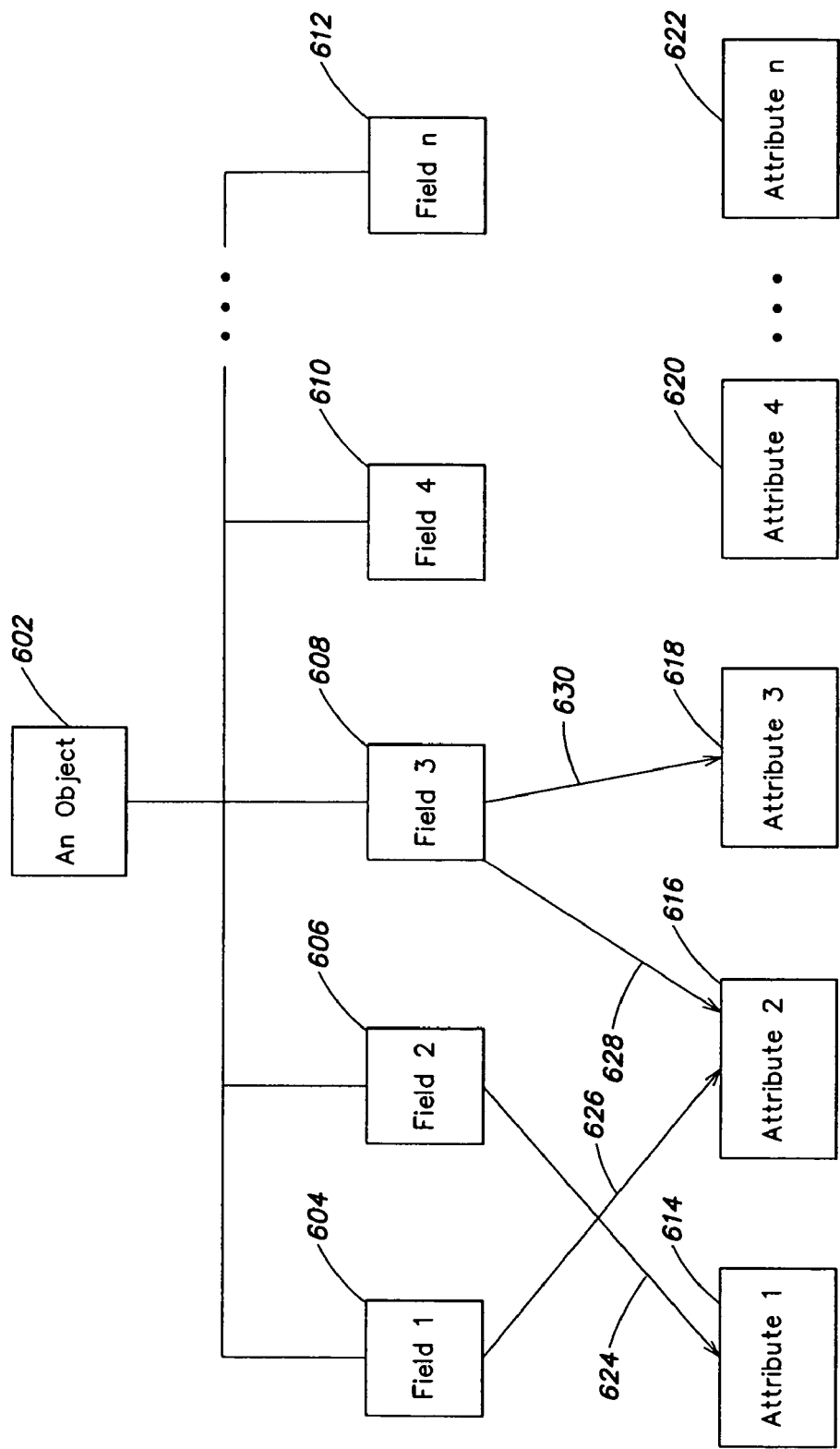
FIG. 6 is a block diagram of an object with several fields and attributes according to one embodiment of the invention.

Furthermore, information contained within each field (a field is either a single question or an answer), or a part of a field, can be further assigned individual attributes. Attributes contain information regarding how each field will be displayed. For example, referring to FIG. 6, an object 602 may include the fields 604–612. Each field can comprise one or more of its own attributes as shown by arrows 624, 626, 628, and 630. In this example, field 1 604 is assigned attribute 2 616, field 2 606 is assigned attribute 1 614, and field 3 608 is assigned attributes 2 616 and 3 630. It is to be appreciated that fields can be assigned any number of attributes, and that attributes can be assigned more than one field. Attributes can include, but are not limited to, color, font, font size, bold, italics, underline, drop-down menu, radio buttons, and text. It is to be appreciated that modifying an attribute at the field or object level is within ordinary skill of one in the art According to one aspect of the invention, a server 301 is provided that functions as a guide to movers. This guide assists users 102 in various aspects related to moving. In one aspect, the system 301 organizes multiple providers 103 related to a single event, such as moving. These providers 103 in turn may provide services and/or products.

Figure 7:
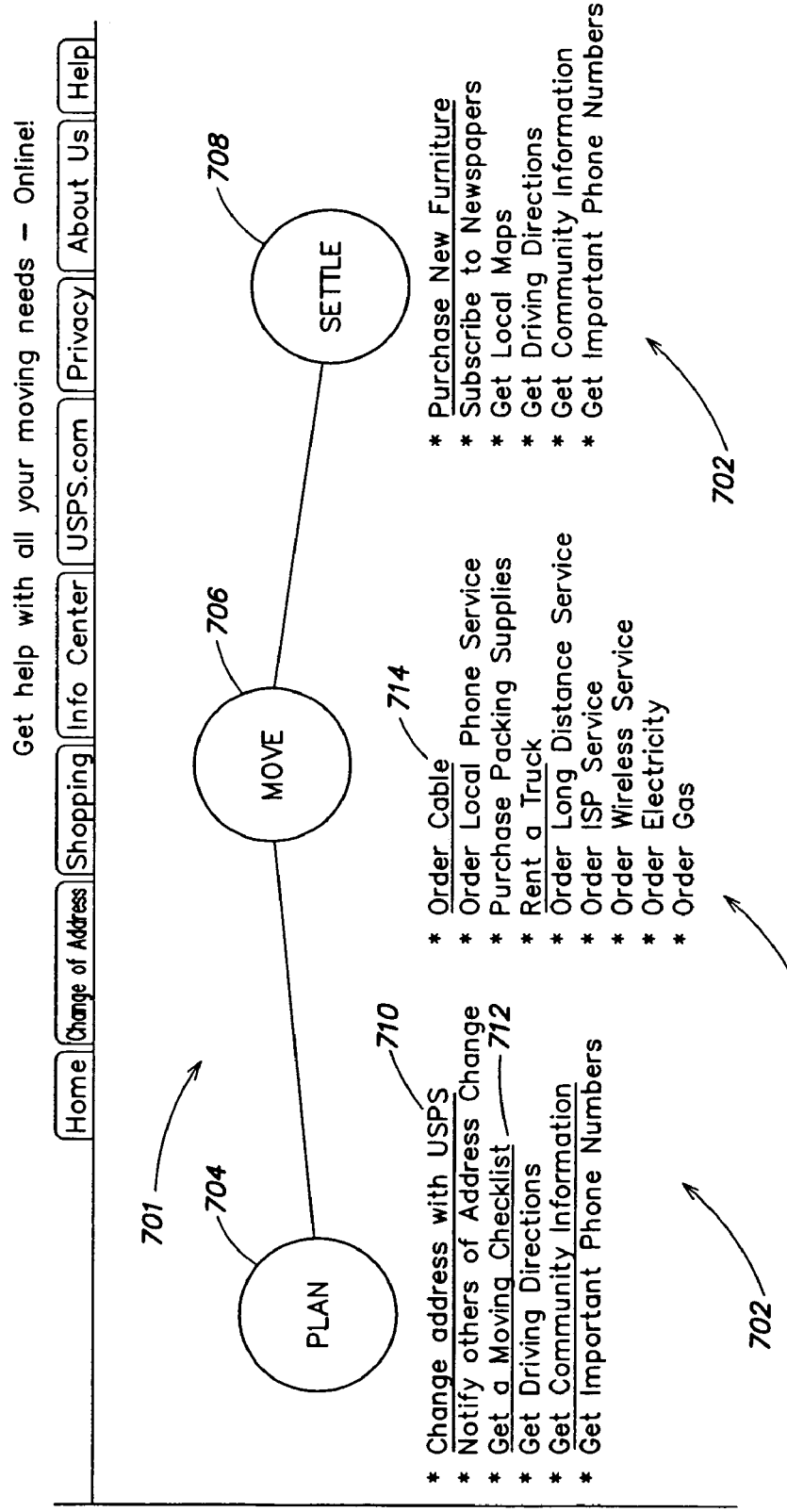
FIG. 7 is a index or home page according to one embodiment of the invention.

For example, FIG. 7 shows an example index or home page 701 for the to-be-released world wide web site MoversGuide.com, developed and operated by the assignee herein. The user 102 will be posed with many options or links 702 under the headings Plan 704, Move 706, and Settle 708.

The first heading, "Plan" 704, contains links 702 to various sites that will assist a user 102 in preparation for an upcoming move. Links 702 under the heading "Plan" may include "Notifying the United States Postal Service about change of address," "Find local government resources," "Notifying friends and family about change of address," "Obtaining and maintaining a moving checklist and timeline," "Obtaining maps and driving directions," "Purchasing moving supplies," "Rent storage space," "Obtaining community information," "Obtaining tips that deal with moving with children," "Obtaining tips that deal with practical packing," and "Obtaining important phone numbers" such as police, fire, etc. However, it is to be appreciated that the links under the heading "Plan" are not limited to the above products and services, and that many more products and services can be added that are within ordinary skill of one in the art.

The second heading entitled "Move" 706 contains links 702 to sites that will be important for a user 102 to access at or close to the time of moving. Links 702 under the heading "Move" may include "Renting a truck," "Connecting and disconnecting cable," "Connecting and disconnecting internet service provider," "Connecting and disconnecting local phone service," "Connecting and disconnecting long distance phone service," "Connecting and disconnecting wireless phone service," "Canceling newspaper subscription," "Obtaining tips that deal with moving with pets," and "Connecting and disconnecting utilities" such as gas, electricity, etc. However, it is to be appreciated that the links under the heading "Move" are not limited to the above products and services, and that many more products and services can be added that are within ordinary skill of one in the art.

The third heading, "Settle" 708, contains links 702 to sites that will assist a user 102 in settling at the users new location. Links 702 under the heading "Settle" may include "Purchasing furniture," "Subscribing to newspaper subscription," "Obtaining local maps," "Obtaining pet service," and "Obtaining banking service." However, it is to be appreciated that the links under the heading "Settle" are not limited to the above products and services, and that many more products and services can be added that are within ordinary skill of one in the art.

It should be clear that many of the links 702 under the headings "Plan," "Move," and "Settle" are further examples of products and services that may be assembled as discussed before in step 402, FIG. 4.

A detailed example will now be explored. Referring back to FIG. 7, if the user 102 were to select the option "Change address with USPS" 710, a new page 801 will appear such as the page disclosed in FIG. 8. FIG. 8 shows several examples of service specific questions. Since there is only one United States Postal Service, each of the questions asked would be considered to be service specific. An example with multiple providers will be further explored below. A user 102 will answer each of the required questions 802, such as those illustrated in FIG. 8. After the user 102 completes the questions 802 and selects the "Continue" button 804, a validation test will be performed on the data to ensure that the user 102 has not entered erroneous data or that the user 102 has not left an answer to a required question 802 blank.

Typical information provided by a user 102 to a provider 103 that may be stored by server 301 includes identification information such as name, title, etc., address information including old address and new address, credit card information, email addresses, shipping information, employment information, financial information, and contact information. However, it is to be appreciated that the type of information requested from a user is not limited to the above, and that additional user information can be added that is within ordinary skill of one in the art.

Server 301 may save information, or specifically not save or share information that should not be shared with other providers 103, such as credit card information. This information may be saved based on user 102 preferences, for example.

After the data has successfully passed the validation test, a new page 901 will appear such as the page disclosed in FIG. 9. Further service specific questions are posed to the user 102 as shown in FIG. 9. FIG. 9 also illustrates an example of an object. In this example, the object could be termed the "address" object 906. The object "address" comprises the questions "OLD Street Address," "City," "State," "ZIP Code," "NEW Street Address," among others. As discussed before, the provider, United States Postal Service in this example, selects the questions posed to the user 102. Questions with like characteristics are then grouped into objects or question groups. The provider can then further select the field attributes within each object or question group. There are many types of attributes that can be applied to a single field or a whole object, and are illustrated in FIG. 9. For example, the drop-down menu 908 under the question "What type of address is your NEW ADDRESS?", the "yes/no" radio buttons 910 under the question "Is your NEW ADDRESS: In Puerto Rico?", and the bolding 912 under the state field are just a few among many types of attributes that can be selected.

After the data has successfully passed the validation test again, a new page 1001 will appear such as the page disclosed in FIG. 10 that will offer the user 102 a chance to verify the data entered for accuracy. After the user selects the "Continuation" button 1004, the transaction will be complete. It is to be appreciated that the various pages, such as those illustrated in FIGS. 8, 9, and 10, can be modified extensively using a programming language such as Java, and/or a web based language such as HTML or XML. For example, pages could be added, deleted, or rearranged, information contained within objects could be added or deleted, attributes could be modified, and many other changes could be made that are known to those of skill in the art.

Turning back to FIG. 5, in another example based on MoversGuide.com, a user 102 could select the link "Get a Moving Checklist" 712 under the heading "Plan" 704. A new page 1101 will appear such as the page disclosed in FIG. 11. This page 1101 will allow a user 102 to create a checklist of things to do before, during, and after a move. In yet another example, FIG. 12 discloses a page 1201 containing community information. This page can also be linked to from the home page 701 as disclosed in FIG. 7.

Turning once again back to FIG. 7, in yet another example based on MoversGuide.com, a user 102 could select the link "Order Cable" 714 under the heading "Move" 706. A new page 1301 will appear such as the page disclosed in FIG. 13. In this example a user 102 has chosen to obtain cable service. The user 102 is prompted with a service specific question 1302 regarding cable. After the user 102 selects the "Continuation" button 1304, a new page 1401 will appear such as the page disclosed in FIG. 14. Again, The user 102 is prompted with a service specific question 1402 regarding cable. After the user 102 selects the "Continuation" button 1404 and the data passes the validation test, a new page 1501 will appear such as the page disclosed in FIG. 15.

FIG. 15 illustrates an example of provider-specific questions 1506, 1508 posed upon a user 102. As discussed before, provider-specific questions are customized to meet the needs of each provider 103. Here, for example, both Provider 1 1510 and Provider 2 1512 ask the same questions, but that is not always the case. After the user 102 selects Provider 1 1510 or Provider 2 1512 or both (the user can select both, in this case the next page will illustrate information regarding both providers) and then further selects the "Continuation" button 1504, a new page 1601 will appear such as the page disclosed in FIG. 16. FIG. 16 illustrates four provider level options 1602 from which a user 102 can select. Here again, a user 102, will select an option 1602 that will result in the appearance of another page. This process will continue until the user 102 completes the transaction or aborts the process. Again, it is to be appreciated that the various pages can be modified extensively. For example, pages could be added, deleted, or rearranged, information contained within objects could be added or deleted, attributes could be modified, and many other changes could be made that is within ordinary skill of one in the art It is an advantage of a System and Method for Sharing Information among Provider Systems of the invention that a user will only have to address one set of common questions for multiple providers due to the object-oriented approach.

The high degree of flexibility is another advantage, in particular the flexibility in assigning attributes at the object and field level. It is another advantage that all user information and provider information is stored in a database. It is another advantage that the server of which the database is housed in has Secure Socket Layer Encryption to protect the information.

Additional detailed information regarding various aspects of the invention appear in Appendices I and II, which are incorporated herein in their entirety and form an integral part of this specification. Included in Appendix I is a detailed example of a newspaper subscription service. Also, included in Appendix I are printouts of pages a user would encounter as the user navigates through a web site designed according to one embodiment of the present invention. Specifically shown are the pages the user would encounter upon considering ordering a newspaper subscription from among the multiple service providers which provide newspaper service. It should be appreciated that the user need not complete any question more than once even if ordering newspaper service from more than one provider. Included in Appendix II is a logical data model of MoversGuide.com, the web site produced by the assignee herein according to one aspect of the present invention.

While several embodiments of a system and method for sharing information among provider systems of the invention have been described and illustrated herein, those of ordinary skill in the art may readily envision a variety of other structures for performing the functions and/or obtaining the results or advantages described herein, and each of such variations or modifications is deemed to be within the scope of the present invention. In addition, those skilled in the art may readily appreciate that all parameters and configurations described herein are meant to be exemplary and that actual parameters and configurations will depend upon specific applications for which the teachings of the present invention are used. Those skilled in the art may also recognize, or be able to ascertain using no more than routine experimentation, equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, structure, combination of structures, system, and/or method described herein. In addition, any combination of two or more such features, structures, combination of structures, systems, and/or methods, provided that such features, systems, structures, combination of structures, and/or methods are not mutually inconsistent, is included within the scope of the present invention. In the claims, all transitional phrases or phrases of inclusion, such as "comprising," "including," "carrying," "having," "containing," and the like are to be understood to be open-ended, i.e. to mean "including but not limited to."

What is claimed is:

1. An information distribution system for use in a system in which a user device is in communication with a plurality of provider systems including at least first and second provider systems, each provider system being operable to process a transaction initiated by the user device, each transaction comprising a provision of information to a provider system by the user device, the information distribution system comprising:

an interface which receives the information provided by the user device;

a database, in communication with the interface, in which the received information is stored; and an information manager in communication with the database and the plurality of provider systems which is operable to:

identify components of information usable by the first provider system or by the second provider system in performing a transaction, wherein said components of information comprise a list of checkout questions used by the first and second provider systems;

determine which of the components of information are related;

upon determining that certain of the components of information are related, group the related components of information into checkout objects;

evaluate the checkout objects to determine a first set of checkout objects to be transmitted to only the first provider system, a second set of checkout objects to be transmitted to only the second provider system, and a third set of checkout objects to be transmitted to both the first provider system and the second provider system; and transmit the first set of checkout objects to the first provider system, the second set of checkout objects to the second provider system, and the third set of checkout objects to the first provider system and the second provider system.

2. The information distribution system according to claim 1, wherein the interface is a network interface coupled to a network including one or more clients.

3. The information distribution system according to claim 1, wherein the database is a relational database (RDBMS).

4. The information distribution system according to claim 1, wherein at least one of the components of information comprises a plurality of data fields provided by the user device.

5. The information distribution system of claim 1, wherein the system further comprises a third provider system, and wherein the information manager is further operable to:

identify components of information usable by the first provider system or by the third provider system in performing a transaction; determine which of the components of information usable by the first provider system and which of the components of information usable by the third provider systems are related;

upon determining that components of information usable by the first provider system or the third provider systems are related, group the related components of information into checkout objects;

compare the checkout objects to determine a first set of checkout objects which should be transmitted to only the first provider system, a fourth set of checkout objects that should be transmitted to only the third provider system, and a fifth set of checkout objects that should be, transmitted to both the first provider system and the third provider system; and transmit the first set of checkout objects to the first provider system, the fourth set of checkout objects to the third provider system, and the fifth set of checkout objects to the first provider system and the third provider system.

6. The information distribution system of claim 1, wherein the database stores a plurality of attributes for each of the components of information, the plurality of attributes including first and second attributes, the first attribute defining a format for providing components of information to the first provider system, the second attribute defining a format for providing components of information to the second provider system, and wherein the information manager is further operable to transmit components of information to the first provider system as defined by the first attribute and to the second provider system as defined by the second attribute.

7. In a system in which a user device is in communication with a plurality of provider systems including at least first and second provider systems, each provider system being operable to process a transaction initiated by the user device, each transaction comprising a provision of information by the user device, a method for sharing information among provider systems, comprising acts of:
   (A) receiving the information provided by the user device;
   (B) storing the information;
   (C) identifying components of information usable by the first provider system or by the second provider system in performing a transaction, wherein said components of information comprise a list of checkout questions used by the first and second provider systems;
   (D) determining which of the components of information are related;
   (E) upon determining that certain of the components of information are related, grouping the related components of information into checkout objects;
   (F) evaluating the checkout objects to determine a first set of checkout objects to be transmitted to only the first provider system, a second set of checkout objects to be transmitted to only the second provider system, and a third set of checkout objects to be transmitted to both the first provider system and the second provider system; and
   (G) transmitting the first set of checkout objects to the first provider system, the second set of checkout objects to the second provider system, and the third set of checkout objects to the first provider system and the second provider system.

8. The method according to claim 7, wherein the act (A) further comprises receiving the information over a communication network.

9. The method according to claim 7, wherein the act (B) further includes storing the information in a database.

10. The method according to claim 7, wherein at least one of the components of information comprises a plurality of data fields provided by the user device.

11. The method of claim 7, wherein the system further comprises a third provider system, the act (C) further comprises identifying components of information usable by the first provider system or by the third provider system in performing a transaction, the act (D) further comprises determining which of the components of information usable by the first provider system and which of the components of information usable by the third provider systems are related, the act (E) further comprises, upon determining in the act (D) that components of information usable by the first provider system or the third provider systems are related, grouping the related components of information into checkout objects, the act (F) further comprises comparing the checkout objects to determine a first set of checkout objects which should be transmitted to only the first provider system, a fourth set of checkout objects that should be transmitted to only the third provider system, and a fifth set of checkout objects that should be transmitted to both the first provider system and the third provider system, and the act (G) further comprises transmitting the first set of checkout objects to the first provider system, the fourth set of checkout objects to the third provider system, and the fifth set of checkout objects to the first provider system and the third provider system.

12. The method of claim 7, wherein the act (B) further comprises storing a plurality of attributes for each of the components of information, the plurality of attributes includes first and second attributes, the first attribute defines a format for providing components of information to the first provider system, the second attribute defines a format for providing components of information to the second provider system, and wherein the act (G) further comprises transmitting components of information to the first provider system as defined by the first attribute and to the second provider system as defined by the second attribute.

13. At least one computer-readable storage medium having instructions encoded thereon, which instructions, when executed in a system in which a user device is in communication with a plurality of provider systems including at least first and second provider systems, each provider system being operable to process a transaction initiated by the user device, each transaction comprising a provision of information by the user device, a method for sharing information among provider systems, perform a method comprising acts of:
   (A) receiving the information provided by the user device;
   (B) storing the information;
   (C) identifying components of information usable by the first provider system or by the second provider system in performing a transaction, wherein said components of information comprise a list of checkout questions used by the first and second provider systems;
   (D) determining which of the components of information are related;
   (E) upon determining that certain of the components of information are related, grouping the related components of information into checkout objects;
   (F) evaluating the checkout objects to determine a first set of checkout objects to be transmitted to only the first provider system, a second set of checkout objects to be transmitted to only the second provider system, and a third set of checkout objects to be transmitted, to both the first provider system and the second provider system; and
   (G) transmitting the first set of checkout objects to the first provider system, the second set of checkout objects to the second provider system, and the third set of checkout objects to the first provider system and the second provider system.

14. The at least one computer-readable storage medium according to claim 13, wherein the act (A) further comprises receiving the information over a communication network.

15. The at least one computer-readable storage medium according to claim 13, wherein the act (B) further includes storing the information in a database.

16. The at least one computer-readable storage medium according to claim 13, wherein the act (C) further comprises identifying the first component of information based upon a mapping between components of the received information and components expected by the first and second provider systems.

17. The at least one computer-readable storage medium according to claim 13, wherein the first component of information comprises a plurality of data fields provided by the user device.

18. The at least one computer-readable storage medium of claim 13, wherein the system further comprises a third provider system, the act (C) further comprises identifying components of information usable by the first provider system or by the third provider system in performing a transaction, the act (D) further comprises determining which of the components of information usable by the first provider system and which of the components of information usable by the third provider systems are related, the act (E) further comprises, upon determining in the act (D) that components of information usable by the first provider system or the third provider systems are related, grouping the related components of information into checkout objects, the act (F) further comprises evaluating the checkout objects to determine a first set of checkout objects which should be transmitted to only the first provider system, a fourth set of checkout objects that should be transmitted to only the third provider system, and a fifth set of checkout objects that should be transmitted to both the first provider system and the third provider system, and the act (G) further comprises transmitting the first set of checkout objects to the first provider system, the fourth set of checkout objects to the third provider system, and the fifth set of checkout objects to the first provider system and the third provider system.

19. The at least one computer-readable storage medium of claim 13, wherein the act (B) further comprises storing a plurality of attributes for each of the components of information, the plurality of attributes including first and second attributes, the first attribute defining a format for providing components of information to the first provider system, the second attribute defining a format for providing the components of information to the second provider system, and wherein the act (G) further comprises transmitting components of information to the first provider system as defined by the first attribute and to the second provider system as defined by the second attribute.

* * * * *